(12) United States Patent
Lim et al.

(10) Patent No.: US 10,137,421 B2
(45) Date of Patent: Nov. 27, 2018

(54) STATIC MIXER

(71) Applicant: DOOSAN HEAVY INDUSTRIES & CONSTRUCTION CO., LTD., Changwon-si, Gyeongsangnam-do (KR)

(72) Inventors: Joong Hyun Lim, Changwon-si (KR); Jongho Hong, Changwon-si (KR); Woochul Kwon, Anyang-si (KR); Sangrin Lee, Changwon-si (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 166 days.

(21) Appl. No.: 15/349,163

(22) Filed: Nov. 11, 2016

(65) Prior Publication Data
US 2017/0136425 A1    May 18, 2017

(30) Foreign Application Priority Data

Nov. 12, 2015 (KR) .................. 10-2015-0159231
Nov. 24, 2015 (KR) .................. 10-2015-0164820

(51) Int. Cl.
*B01F 5/00*          (2006.01)
*B01F 5/04*          (2006.01)
(Continued)

(52) U.S. Cl.
CPC ........ *B01F 5/0604* (2013.01); *B01D 53/8631* (2013.01); *B01F 3/02* (2013.01);
(Continued)

(58) Field of Classification Search
CPC ...... B01F 2005/0005; B01F 2005/0037; B01F 2005/004; B01F 3/026; B01F 5/0082; B01F 5/0403; B01F 5/0604; F01N 3/2892
See application file for complete search history.

(56) References Cited

U.S. PATENT DOCUMENTS 4,050,903 A * 9/1977 Bailey .................. F01N 3/2885
                                                422/177
4,054,418 A * 10/1977 Miller ................ B01D 53/8653
                                                110/203
(Continued)

FOREIGN PATENT DOCUMENTS

EP     2320142 A1    5/2011
EP     2620208 A1    7/2013
(Continued)

OTHER PUBLICATIONS

Communication dated Nov. 14, 2016 issued by the Korean Patent Office in counterpart application No. 10-2015-0164820.
(Continued)

*Primary Examiner* — Tony G Soohoo
(74) *Attorney, Agent, or Firm* — Invenstone Patent, LLC

(57) ABSTRACT

A static mixer for mixing exhaust gases to be supplied to a selective catalytic reduction device located at the back of a boiler, includes a gas accommodation part having a first inlet and a plurality of second inlets partitioned from each other to introduce gases having different temperatures thereinto so that the gases introduced through the first inlet and the plurality of second inlets flow to a plurality of divided sections. A discharge part is provided that communicates with the gas accommodation part to collect and discharge the gases and a mixing plate part is provided, which has a plurality of unit plates disposed on the upper and lower portions of a hollow portion of the discharge part in such a manner as to have a given angle with respect to the directions of the gases discharged.

14 Claims, 11 Drawing Sheets
(2 of 11 Drawing Sheet(s) Filed in Color)

(51) Int. Cl.
  *B01F 5/06* (2006.01)
  *B01F 3/02* (2006.01)
  *B01D 53/86* (2006.01)
  *F01N 3/28* (2006.01)

(52) U.S. Cl.
  CPC ............ *B01F 3/026* (2013.01); *B01F 5/0082* (2013.01); *B01F 5/0403* (2013.01); *B01F 5/0618* (2013.01); *F01N 3/2892* (2013.01); *B01F 2005/004* (2013.01); *B01F 2005/0005* (2013.01); *B01F 2005/0037* (2013.01); *B01F 2005/0636* (2013.01)

(56) References Cited

U.S. PATENT DOCUMENTS

| | | | | |
|---|---|---|---|---|
| 4,264,212 | A * | 4/1981 | Tookey | B01F 5/0403 239/433 |
| 4,793,247 | A * | 12/1988 | Verweij | B01F 5/0082 366/336 |
| 7,581,387 | B2 * | 9/2009 | Bui | F01N 3/101 60/274 |
| 9,909,478 | B2 * | 3/2018 | Fejer-Simon | F01N 3/2892 |
| 2007/0081420 | A1 * | 4/2007 | Hempel | B01F 5/0604 366/340 |
| 2010/0212292 | A1 * | 8/2010 | Rusch | F01N 3/2066 60/274 |
| 2010/0293931 | A1 * | 11/2010 | Peters | B01D 53/9431 60/324 |
| 2011/0113764 | A1 * | 5/2011 | Salanta | F01N 3/2066 60/303 |
| 2011/0146254 | A1 * | 6/2011 | Yi | B01F 3/04049 60/310 |
| 2014/0077400 | A1 * | 3/2014 | Sampath | B01F 5/0473 261/74 |
| 2014/0298781 | A1 * | 10/2014 | Naga | F01N 3/2892 60/301 |
| 2014/0326221 | A1 * | 11/2014 | Raindl | B01F 5/0421 123/527 |
| 2014/0366513 | A1 * | 12/2014 | Mueller-Haas | F01N 3/2066 60/295 |
| 2015/0040547 | A1 * | 2/2015 | Brockman | F01N 3/2892 60/324 |
| 2016/0032810 | A1 * | 2/2016 | Denis | F01N 3/2892 60/324 |
| 2016/0348557 | A1 * | 12/2016 | Dalimonte | F01N 3/021 |
| 2017/0113195 | A1 * | 4/2017 | Ladd | B01F 5/0659 |
| 2017/0136425 | A1 * | 5/2017 | Lim | B01F 5/0604 |
| 2017/0314443 | A1 * | 11/2017 | Simon | F01N 3/2892 |
| 2018/0050907 | A1 * | 2/2018 | Finnerty | C01B 3/386 |
| 2018/0156092 | A1 * | 6/2018 | Incl N | F01N 3/2066 |

FOREIGN PATENT DOCUMENTS

| | | |
|---|---|---|
| JP | 7-217859 A | 8/1995 |
| JP | 2010-144569 A | 7/2010 |
| JP | 2010-196708 A | 9/2010 |
| JP | 2011-32971 A | 2/2011 |
| JP | 2013-087745 A | 5/2013 |
| JP | 2015-075015 A | 4/2015 |
| KR | 1999-0036949 A | 5/1999 |
| KR | 10-2002-0015717 A | 2/2002 |
| KR | 10-2005-0033605 A | 4/2005 |
| KR | 10-2012-0005304 A | 1/2012 |
| KR | 10-2012-0041275 A | 5/2012 |
| KR | 10-2013-0108677 A | 10/2013 |
| KR | 10-1409584 B1 | 6/2014 |
| WO | 2014039039 A1 | 3/2014 |

OTHER PUBLICATIONS

Communication dated Dec. 2, 2016 issued by the Korean Patent Office in counterpart application No. 10-2015-0159231.
Communication dated Apr. 19, 2017 issued by the European Patent Office in counterpart application No. 16198408.3.

* cited by examiner

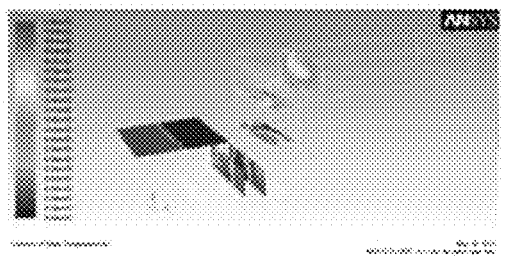
Fig. 7(a)
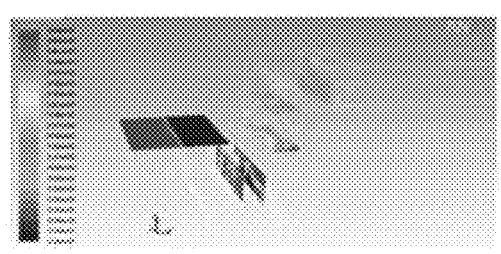
Fig. 7(b)
result of CFD analysis
| | BMCR | BMCR | BMCR | BMCR |
|---|---|---|---|---|
| Mixer No. | no mixer | mixer having intermediate portion closed | mixer of the present invention |
| Max temp(℃) | 380.9 | 379.6 | 372.8 |
| Min temp(℃) | 357.8 | 365.5 | 360.4 |
| △T (℃) | 23.1 | 14.1 | 12.4 |
Pressure (Pascal)
| before mixer (Pa) | 88.1 | 260.7 | 251.5 |
|---|---|---|---|
| test plane (Pa) | 42.4 | 41.5 | 38.3 |
| △P (Pa) | 45.6 | 219.2 | 213.2 |
| Pressure drop: additional pressure drop by mixer | | 173.6 | 167.6 |
FIG. 8

STATIC MIXER

CROSS REFERENCE TO RELATED APPLICATIONS

The present application claims the benefit of Korean Patent Application No. 10-2015-0159231 and 10-2015-0164820 filed in the Korean Intellectual Property Office on Nov. 12, 2015 and Nov. 24, 2015 respectively, the entire contents of which are incorporated herein by reference.

The present disclosure relates to a static mixer for mixing exhaust gases, and more particularly, to a static mixer for mixing exhaust gases that is configured wherein an open intermediate flow path is formed between upper unit plates and lower unit plates in consideration of a flow phenomenon, thereby reducing the number of unit plates needed in a conventional practice to save the manufacturing cost thereof, improving the mixing efficiency through the generation of complicated flows like vortexes, and achieving a pressure loss more reduced than a pressure loss in the static mixer having the intermediate flow path portion not open.

BACKGROUND OF THE RELATED ART

Generally, there is a strict condition that a temperature distributed on the section of a duct on the entrance of an SCR (selective catalytic reduction) device located at the back of a boiler should be 20° C. or above or below to the maximum. So as to satisfy the condition, accordingly, there is a need for a structure of a duct capable of allowing the exhaust gases passing through a backpass economizer of the boiler to be mixed with each other to achieve uniform temperature distribution.

By the way, the duct structures in conventional practices have relatively small pressure losses in the mixing process of the exhaust gases having different temperatures, but they do not completely satisfy the condition that the temperature distributed on the section of the duct on the entrance of the SCR device should be 20° C. or above or below to the maximum.

SUMMARY

Accordingly, the present disclosure has been made in view of the above-mentioned problems occurring in the prior art, and it is an object of the present disclosure to provide a static mixer for mixing exhaust gases that is capable of generating complicated flows like vortexes on the region of a discharge part thereof, thereby improving the mixing efficiency for the exhaust gases having different temperatures and minimizing the pressure loss thereof.

To accomplish the above-mentioned object, according to the present disclosure, there is provided a static mixer for mixing exhaust gases to be supplied to a selective catalytic reduction device located at the back of a boiler, the static mixer including: a gas accommodation part having a first inlet and a plurality of second inlets partitioned from each other to introduce gases having different temperatures thereinto so that the gases introduced through the first inlet and the plurality of second inlets flow to a plurality of divided sections; a discharge part communicating with the gas accommodation part to collect and discharge the gases; and a mixing plate part having a plurality of unit plates disposed on the upper and lower portions of a hollow portion of the discharge part in such a manner as to have a given angle with respect to the directions of the gases discharged.

According to the present disclosure, desirably, the mixing plate part includes: a plurality of pairs of support pipes having one end coupled to the inner bottom surface of the hollow portion of the discharge part and the other end coupled to the inner top surface of the hollow portion of the discharge part; and the plurality of unit plates whose both ends coupled to the plurality of pairs of support pipes.

According to the present disclosure, desirably, the plurality of unit plates includes: lower unit plates for blocking a portion of the lower flow path formed by the hollow portion of the discharge part; and upper unit plates for blocking a portion of the upper flow path formed by the hollow portion of the discharge part.

According to the present disclosure, desirably, the lower unit plates are disposed traversely with a given angle with respect to the directions of the flows of exhaust gases discharged through the discharge part, and the upper unit plates are disposed crossedly with a given angle with respect to the lower unit plates.

According to the present disclosure, desirably, each support pipe includes: a connection pipe connected thereto to supply each exhaust gas to the interior thereof; and at least one or more nozzles disposed on the outer peripheral surface thereof to discharge the exhaust gas supplied to the interior thereof.

According to the present disclosure, desirably, the at least one or more nozzles are disposed with given angles in up and down or left and right directions with respect to the advancing directions of the exhaust gases.

BRIEF DESCRIPTION OF THE DRAWINGS

The patent or application file contains at least one drawing executed in color. Copies of this patent or patent application publication with color drawings will be provided by the Office upon request and payment of the necessary fee. The above and other objects, features and advantages of the present disclosure will be apparent from the following detailed description of the preferred embodiments of the invention in conjunction with the accompanying drawings, in which:

FIGS. 7a and 7b are temperature distribution charts, wherein FIG. 7a shows the mixing plate part having no intermediate flow path and FIG. 7b shows the mixing plate part having an intermediate flow path;

FIG. 8 is a table showing the temperature distribution and pressure loss according to CFD analysis results;

DETAILED DESCRIPTION OF THE PREFERRED EMBODIMENTS

Figure 1:
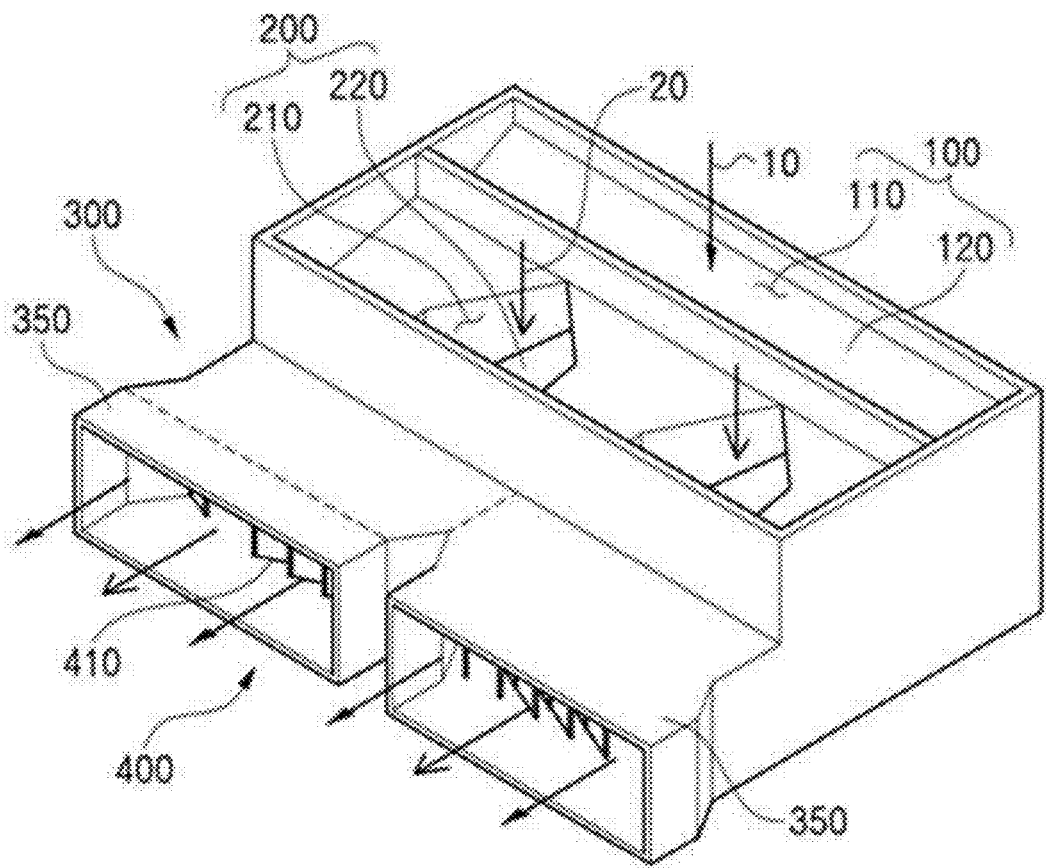
FIG. 1 is a perspective view showing a static mixer for mixing exhaust gases according to the present disclosure.

Hereinafter, the present disclosure is disclosed with reference to the attached drawings wherein the corresponding parts in the embodiments of the present disclosure are indicated by corresponding reference numerals and the repeated explanation on the corresponding parts will be avoided. If it is determined that the detailed explanation on the well known technology related to the present disclosure makes the scope of the present disclosure not clear, the explanation will be avoided for the brevity of the description.

In the description, terms, such as the first, the second, A, B, (a), and (b) may be used to describe various elements, but the elements should not be restricted by the terms. The terms are used to only distinguish one element from the other element. When it is said that one element is described as being "connected" or "coupled" to the other element, one element may be directly connected or coupled to the other element, but it should be understood that another element may be present between the two elements. In contrast, when it is said that one element is described as being "directly connected" or "directly coupled" to the other element, it should be understood that another element is not present between the two elements.

Figure 2:
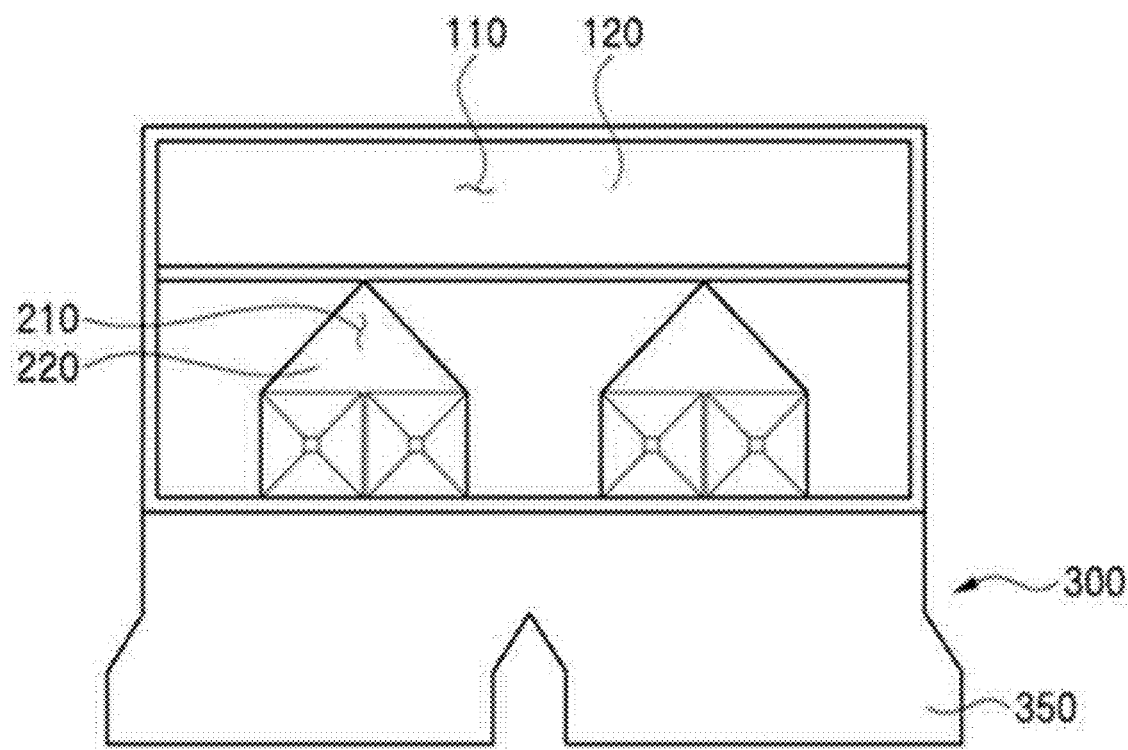
FIG. 2 is a top view showing the static mixer for mixing exhaust gases according to the present disclosure.
Figure 3:
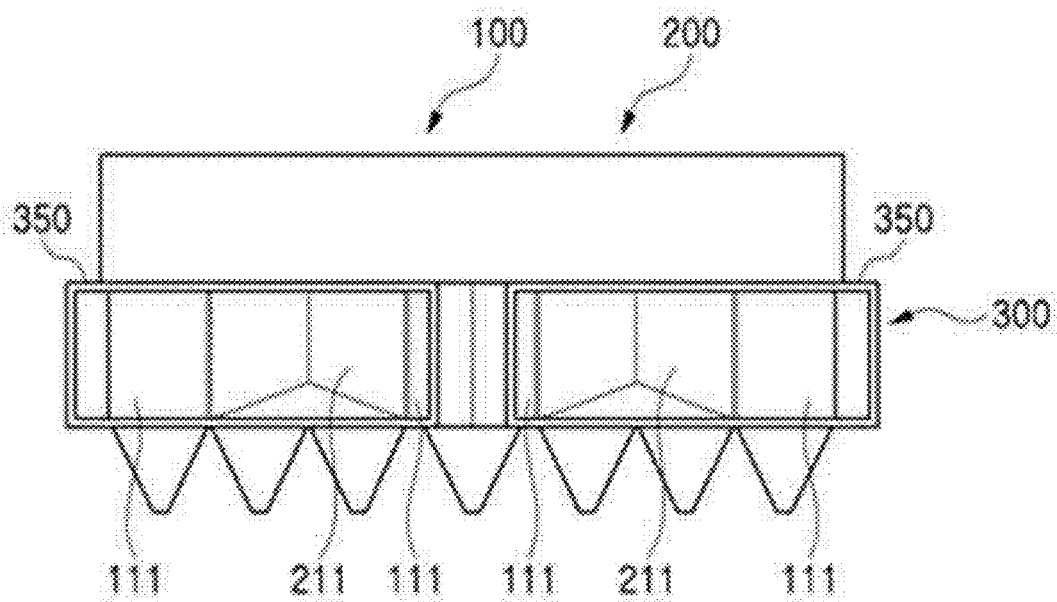
FIG. 3 is a front view showing the static mixer for mixing exhaust gases according to the present disclosure, wherein a mixing plate part is removed from the static mixer.

As shown in FIGS. 1 to 3, a static mixer for mixing exhaust gases according to the present disclosure has a structure of a mixing duct for mixing exhaust gases, which is disposed on a selective catalytic reduction device located at the back of a boiler and includes first and second gas accommodation parts 100 and 200 through which gases 10 and 20 having different temperatures from each other flow separately. The first and second gas accommodation parts 100 and 200 have a first inlet 110 and a plurality of second inlets 210 partitioned from each other, and the gases 10 and 20 having different temperatures from each other, which are introduced from the first inlet 110 and the plurality of second inlets 210, are changed in flow paths and flow to a plurality of sections 111 and 211. At this time, the plurality of sections 111 and 211 is arranged in such a manner as to allow the gases and 20 having different temperatures introduced from the first inlet 110 and the second inlets 210 to flow alternately.

Figure 4:
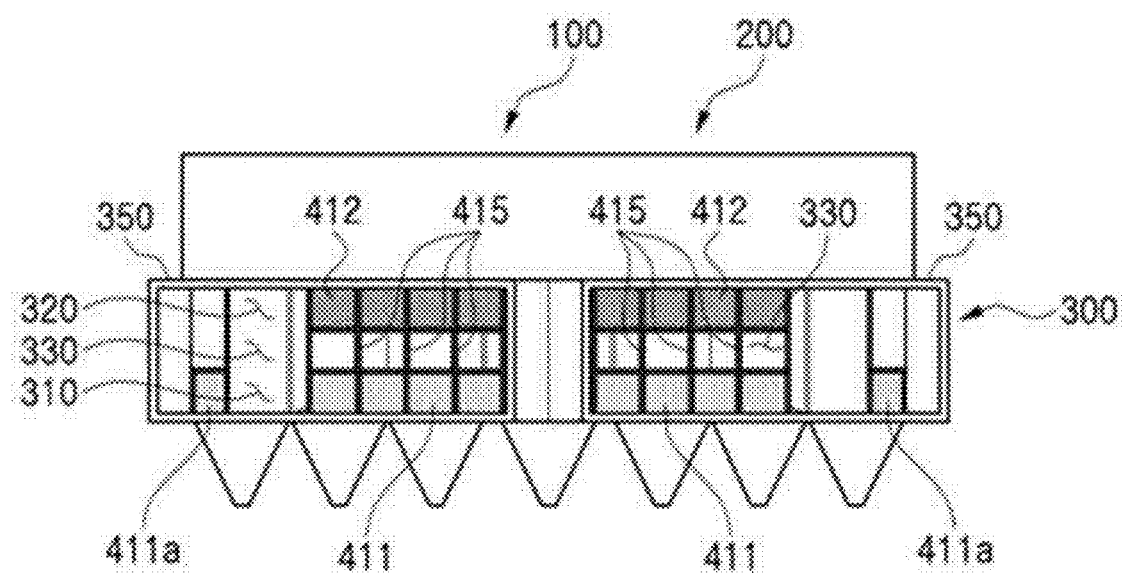
FIG. 4 is a front view showing the static mixer for mixing exhaust gases according to the present disclosure, wherein the mixing plate part is disposed on the static mixer.
Figure 5:
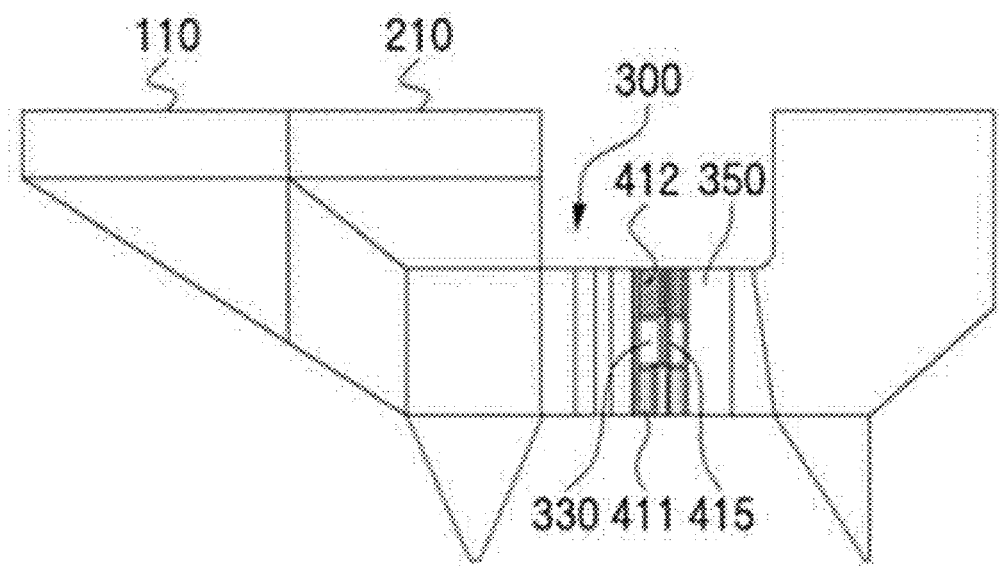
FIG. 5 is a side view showing the static mixer for mixing exhaust gases according to the present disclosure.

The plurality of sections 111 and 211 communicates with the first and second gas accommodation parts 100 and 200 and is also connected to a discharge part 300 in which the gases 10 and 20 having different temperatures are collected and discharged. As shown in FIGS. 4 and 5, a mixing plate part 400 is disposed on the upper and lower portions 310 and 320 of a hollow portion of the discharge part 300 in such a manner as to form an open region on the center portion 330 of the hollow portion thereof and includes a plurality of unit plates 410 having a given angle (a predetermined angle) with respect to the direction of the exhaust gases discharged.

In more detail, the first gas accommodation part 100 includes the first inlet 110 formed on the top thereof and a first slant surface 120 having a given angle, and the second gas accommodation part 200 includes the second inlets 210 separated from the first inlet 110 to form separate flow paths and second slant surfaces 220 having a given angle. The first slant surface 120 and the second slant surfaces 220 serve to induce the flows of exhaust gases to the discharge part 300.

In this case, the gases 10 and 20, which are accommodated in the first and second gas accommodation parts 100 and 200 and introduced into the first inlet 110 and the plurality of second inlets 210, have different temperatures and particle densities from each other.

For example, if the gas 10 accommodated in the first gas accommodation part 100 has a high temperature, the gas 20 accommodated in the second gas accommodation part 200 has a lower temperature than the gas 10. Of course, the gas 10 may have a lower temperature than the gas 20.

According to the present disclosure, the second gas accommodation part 200 is closer to the discharge part 300 than the first gas accommodation part 100 with respect to the flows of exhaust gases. At this time, the second inlets 210 are formed independently of each other, while not communicating with each other, but they communicate with the discharge part 300. Accordingly, the gases 10 and 20 having different temperatures introduced from the first inlet 110 and the second inlets 210 can be alternately discharged.

Further, the discharge part 300 includes a plurality of branched ducts 350 communicating with the hollow portion coupled to the mixing plate part 400 in such a manner as to be arranged in the directions of the exhaust gases discharged.

Figure 6:
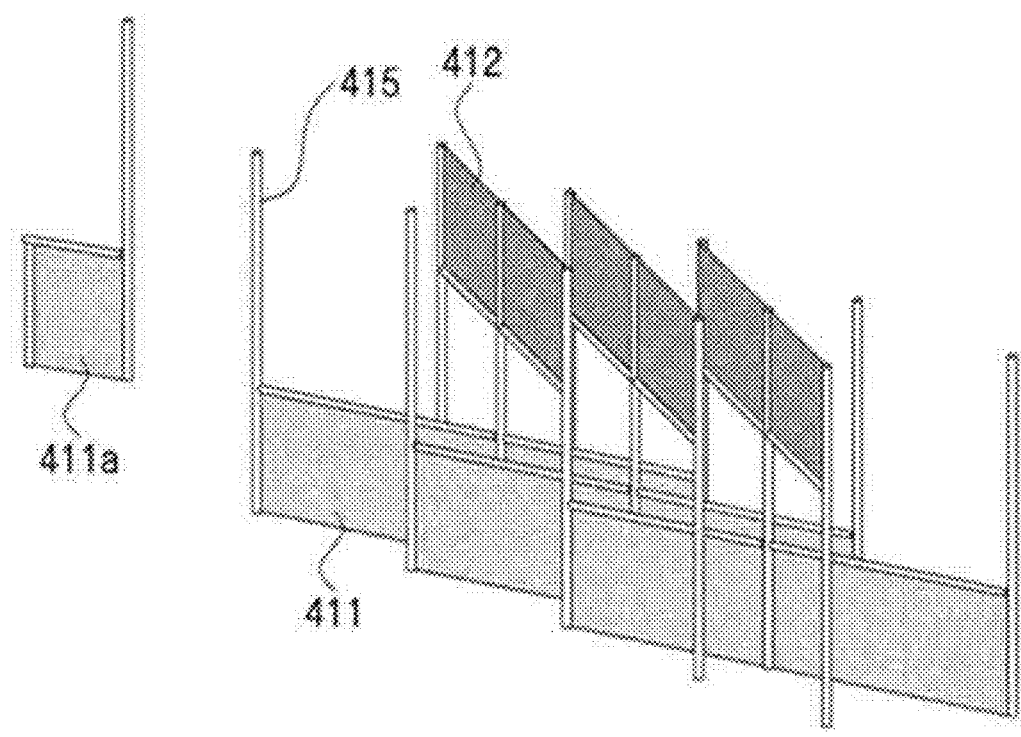
FIG. 6 is a perspective view showing a portion of the mixing plate part of the static mixer for mixing exhaust gases according to the present disclosure.

As shown in FIG. 6, the mixing plate part 400 includes: a plurality of one pair of support pipes 415 having one end coupled to the inner bottom surface of the hollow portion of the discharge part 300 and the other end coupled to the inner top surface of the hollow portion of the discharge part 300; and a plurality of unit plates 411, 412, and 411a whose both ends are coupled to the pairs of support pipes 415.

So as to allow the center portion 330 as the intermediate region in the width direction of the discharge part 300 to be empty, in this case, the unit plates include lower unit plates 411 for blocking a portion of the lower flow path formed by the hollow portion and upper unit plates 412 for blocking a portion of the upper flow path formed by the hollow portion. Further, the unit plates include lower unit plates 411a disposed on the outer corners of the discharge part 300, not together with the upper unit plates 412.

According to the present disclosure, SCH (Schedule) pipes are applied to the ends of the unit plates 411, 412 and 411a so as to release the structural problems like the increment of vibrations and stresses generated when the exhaust gases are passed through the center portion 330 of the discharge part 300.

In this case, as shown in FIG. 6, the lower unit plates 411 are disposed traversely with a given angle with respect to the directions of the flows of exhaust gases discharged through the discharge part 300, and the upper unit plates 412 are disposed crossedly with a given angle with respect to the lower unit plates 411.

Accordingly, the lower unit plates 411 and the upper unit plates 412 traverse the flows of exhaust gases, and the gases passing through the lower unit plates 411 and the upper unit plates 412 cross each other, so that mixing between the gases 10 and 20 having different temperatures becomes excellent to allow the gases 10 and 20 to become substantially uniform in their temperature distribution through the mixing plate part 400.

As mentioned above, there is a strict condition that a temperature difference between a high temperature gas and a low temperature gas on the entrance of the SCR device located at the back of the boiler should be 20° C. or above or below to the maximum. According to the present disclosure, the exhaust gases having different temperatures are effectively mixed through the lower unit plates 411 and the upper unit plates 412 crossing each other, so that the temperature distribution on the entrance of the SCR device can be more uniform than that in the conventional practice.

According to the present disclosure, furthermore, the center portion 330 of the discharge part 300, which is located between the lower unit plates 411 and the upper unit plates 412, is empty. In this case, if complicated flows like vortexes occur through the lower unit plates 411 and the upper unit plates 412 crossing each other, the mixing efficiency is improved, but the pressure loss is increased. Through the empty center portion 330, accordingly, the problem of the pressure loss can be solved. Through the empty center portion 330, further, the flows of exhaust gases are kept to the center portion 330 so that the directions of flows of exhaust gases through the lower unit plates 411, the center portion 330, and the upper unit plates 412 are different from each other to induce more effective mixing.

The static mixer according to the present disclosure has the structure wherein the lower unit plates 411 and the upper unit plates 412 cross each other to improve the mixing efficiency through the turbulent flows and the structure wherein the lower unit plates 411 and the upper unit plates 412 block portions of the lower and upper flow paths of the hollow portion of the discharge part 300 to reduce the pressure loss and material costs and to improve the mixing efficiency through the complicated flows.

According to the present disclosure, three upper unit plates 412 are disposed on each branched duct 350, and three lower unit plates 411 pair with the three upper unit plates 412 in such a manner as to cross with the three upper unit plates 412. Further, the lower unit plate 411a is spaced apart from the upper unit plate 412 on the outer corner of each branched duct 350.

According to the CFD analysis, as shown in FIG. 7, the static mixer having the above-mentioned configuration allows the high temperature gas and the lower temperature gas to cross each other through the mixing plate part 400 and at the same time allows the center portion 330 of the discharge part 300 to be empty, so that vortexes are generated to permit the temperatures to be uniformly distributed.

Through the results of the CFD analysis, accordingly, the effects listed in the table of FIG. 8 can be checked.

According to the results of the CFD analysis, a deviation between the maximum temperature and the minimum temperature is 23.1° C. in a general duct structure where no static mixer is disposed.

On the other hand, a deviation between the maximum temperature and the minimum temperature is 14.1° C. in a structure where a static mixer is disposed but the upper unit plates 412 and the lower unit plates 411 cross each other in such a manner as to block the entire flow path of the hollow portion of the discharge 300, while not having any empty space on the center portion 330 of the flow path of the hollow portion of the discharge 300. Through the above results, it can be checked that the formation of the mixing plate part 400 enables the temperature distribution to be uniformly generated.

Lastly, a deviation between the maximum temperature and the minimum temperature is 12.4° C. in a structure where the static mixer of the present disclosure is provided with three flow path regions divided by the lower unit plates 411, the center portion 330, and the upper unit plates 412, and in this structure, the smallest deviation can be obtained.

According to the results of the pressure drops for the respective structures, a pressure loss is 45.6 pa in the general duct structure where no static mixer is disposed, which is the smallest value, but the deviation between the maximum temperature and the minimum temperature is 23.1° C., so that the structure does not satisfy the temperature condition on the entrance of the SCR device and accordingly, it is not usable as the equipment at the back of the boiler.

Contrarily, a pressure loss is 173.6 pa in the structure where the static mixer according to the present disclosure is disposed to allow the upper unit plates 412 and the lower unit plates 411 to cross each other in such a manner as to block the entire flow path of the hollow portion of the discharge 300, and a pressure loss is 167.6 pa in the structure where the static mixer according to the present disclosure is disposed to allow the center portion 330 of the discharge 300 to be open, which is more reduced than that in the structure where the upper unit plates 412 and the lower unit plates 411 cross each other, while having no empty center portion 330.

Especially, it should be noted that the structure where the static mixer allows the center portion 330 of the discharge 300 to be open can have more reduced pressure drop and more uniform temperature distribution than the structure where the static mixer allows the upper unit plates 412 and the lower unit plates 411 cross each other, while having no empty center portion 330. Accordingly, the structure wherein the flow path of the hollow portion of the discharge part 300 is divided into three regions of the lower unit plates 411, the center portion 330, and the upper unit plates 412 becomes the most excellent structure in consideration of the temperature condition on the entrance of the SCR device.

On the other hand, another example of the mixing plate part 400 having nozzles will be explained with reference to FIGS. 9 to 11.

Figure 9:
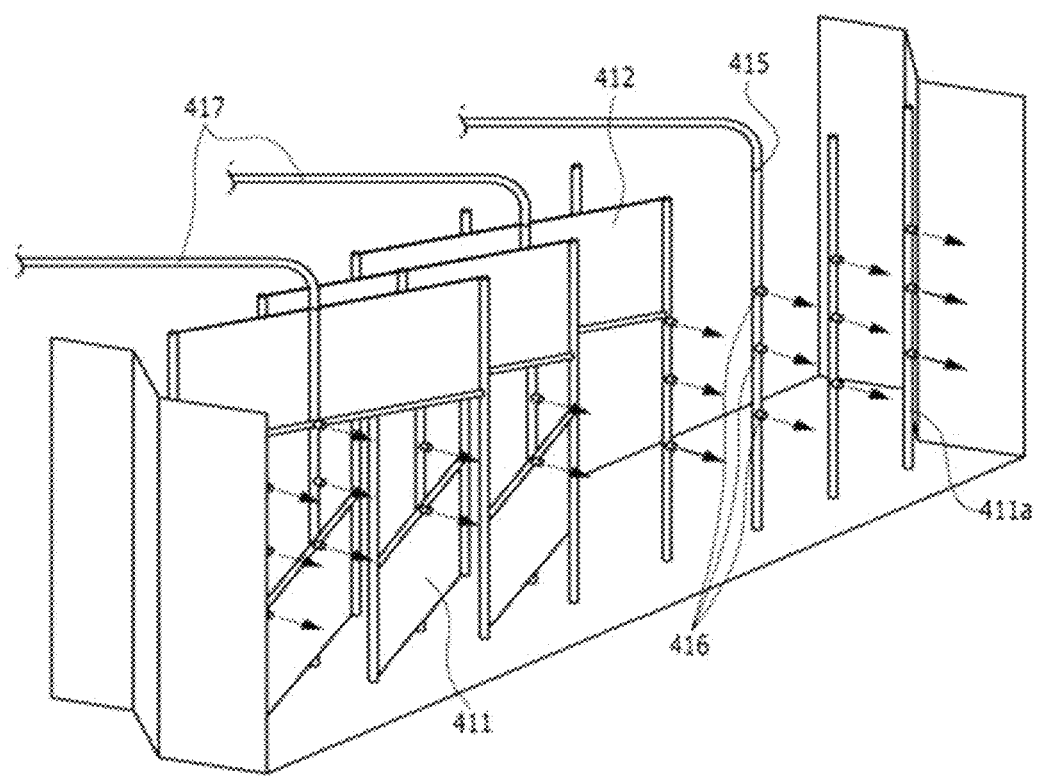
FIG. 9 is a perspective view showing another example of the mixing plate part in the static mixer for mixing exhaust gases according to the present disclosure.

As shown in FIG. 9, the mixing plate part 400 includes: a plurality of pairs of support pipes 415 having one end coupled to the inner bottom surface of the hollow portion of the discharge part 300 and the other end coupled to the inner top surface of the hollow portion of the discharge part 300; and a plurality of unit plates 410 whose both ends are coupled to the pairs of support pipes 415.

At this time, each support pipe 415 is hollow in the interior thereof and has a connection pipe 417 whose one end connected to one side of the top or underside end thereof, the other end of the connection pipe 417 communicating with the first and second gas accommodation parts 100 and 200. Accordingly, the portion of the exhaust gases introduced into the first and second gas accommodation parts 100 and 200 is collected to the connection pipes 417 and introduced directly into the support pipes 415.

Figure 10:
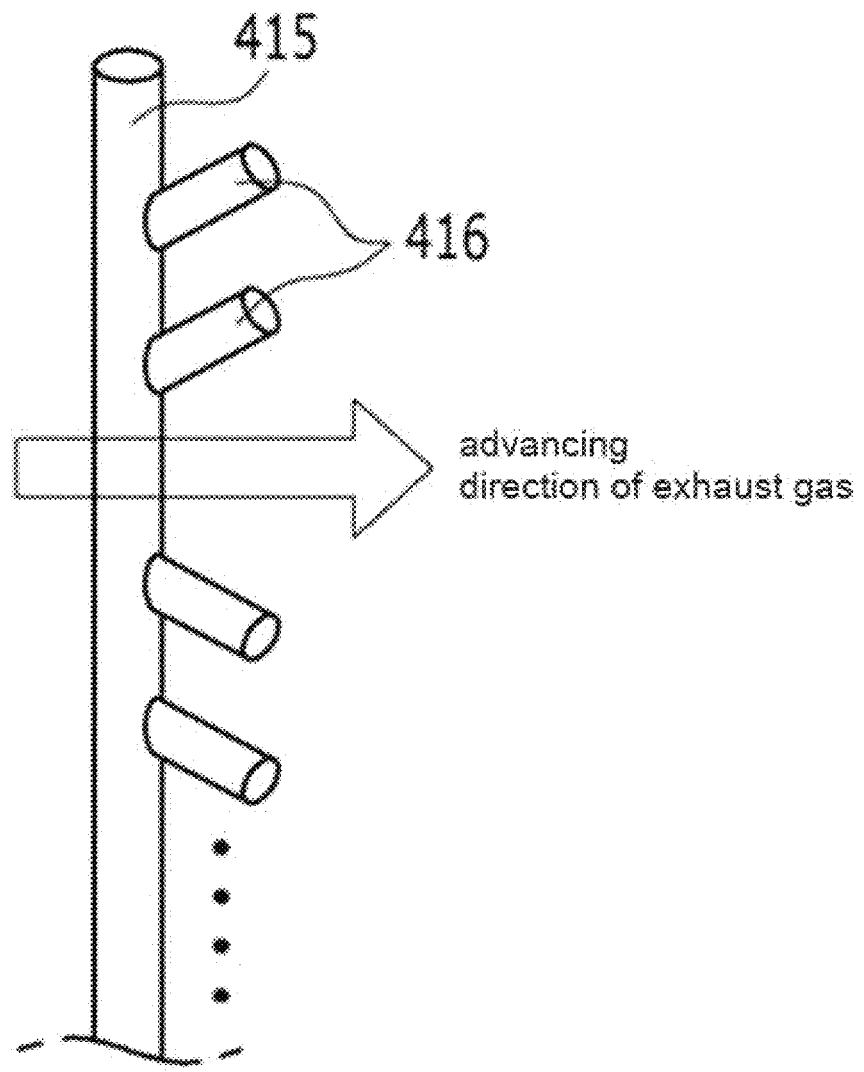
FIG. 10 is a perspective view showing an example of installation angles of nozzles disposed on the mixing plate part of FIG. 9.
Figure 11:
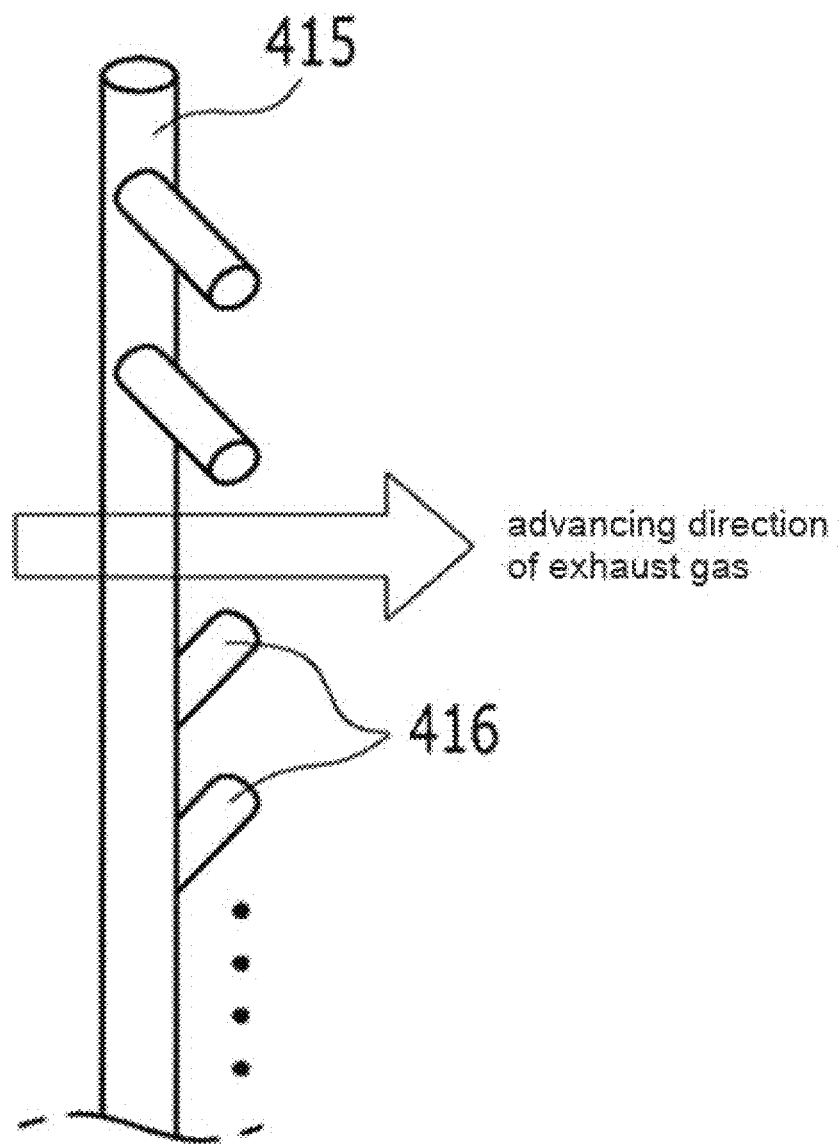
FIG. 11 is a perspective view showing another example of installation angles of nozzles disposed on the mixing plate part of FIG. 9.

Further, each support pipe 415 has at least one or more nozzles 416 disposed on the outer peripheral surface thereof in a longitudinal direction thereof, and if the nozzles 416 are disposed, as shown in FIGS. 10 and 11, they are located with given angles in up and down or left and right directions with respect to the advancing directions of the exhaust gases flowing to the sides of the support pipes 415.

Accordingly, the exhaust gases having the given angles in the up and down or left and right directions with respect to the exhaust gases flowing to the sides of the support pipes 415 are secondarily discharged from the nozzles 416, thereby generating more complicated turbulent flows to improve the mixing efficiency. As a result, the temperature distribution of the gases 10 and 20 having different temperatures can be more uniformly obtained.

Figure 12:
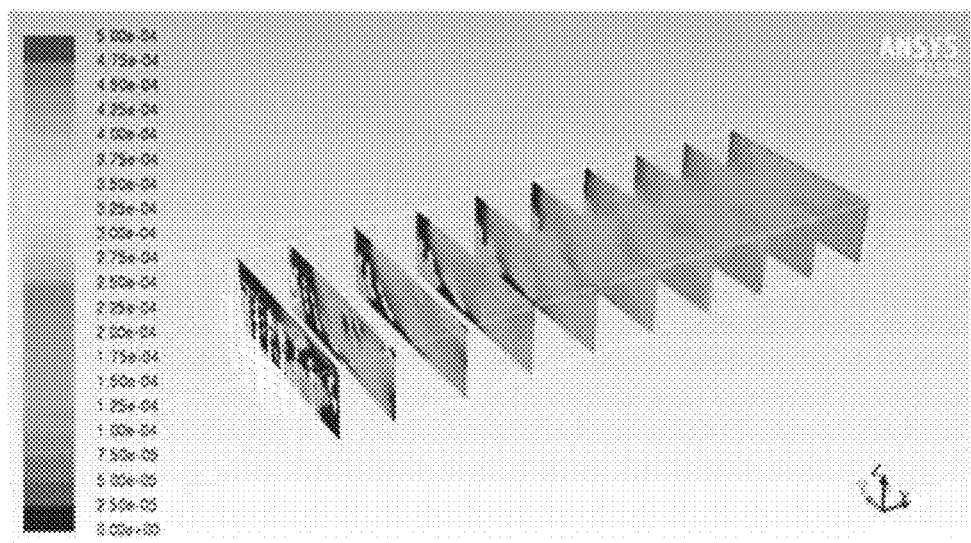
FIG. 12 is a graph showing the CFD analysis results of the temperature variations in the static mixer having the mixing plate part of FIG. 9.

FIG. 12 is a graph showing the CFD analysis results of the temperature variations in the static mixer having the mixing plate part of FIG. 9.

According to the results of the CFD analysis, as shown in FIG. 12, it is checked that the gases 10 and 20 having different temperatures from each other are effectively mixed within shorter time and distance, so that temperature distribution can be uniform rapidly.

Accordingly, if the nozzles 416 are disposed on the support pipes 415 to secondarily discharge the exhaust gases, and further, if the installation angles or lengths of the nozzles 416 are appropriately adjusted, the mixing effects of the exhaust gases can be more excellent than those in the conventional practice.

As set forth in the foregoing, the static mixer for mixing exhaust gases according to the present disclosure is configured wherein the upper unit plates and the lower unit plates crossing each other are located on the region of the discharge part to generate complicated flows like vortexes, thereby improving the mixing efficiency, so that it is possible to satisfy the strict condition that a temperature distributed on the section of the duct on the entrance of the SCR device should be 20° C. or above or below to the maximum.

Further, the static mixer for mixing exhaust gases according to the present disclosure is configured wherein the open intermediate flow path is formed between the upper unit plates and the lower unit plates, thereby achieving more reduced pressure loss than the static mixer having the intermediate flow path portion not open and further reducing the number of unit plates to save the manufacturing cost thereof.

Additionally, the static mixer for mixing exhaust gases according to the present disclosure is configured wherein the nozzles are disposed on the support pipes supporting the upper unit plates and the lower unit plates to discharge portion of exhaust gases, thereby more improving the mixing efficiency of the exhaust gases.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure.

What is claimed is:

1. A static mixer for mixing exhaust gases to be supplied to a selective catalytic reduction device located at the back of a boiler, the static mixer comprising:
    a gas accommodation part having a first inlet and a plurality of second inlets partitioned from each other to introduce gases having different temperatures thereinto so that the gases introduced through the first inlet and the plurality of second inlets flow to a plurality of divided sections;
    a discharge part communicating with the gas accommodation part to collect and discharge the gases, the discharge part including a hollow portion; and
    a mixing plate part having a plurality of unit plates disposed on the upper and lower portions of the hollow portion of the discharge part in such a manner as to have a predetermined angle with respect to flow directions of the exhaust gases discharged,
    wherein the plurality of second inlets are formed independently of each other in a length direction of the gas accommodation part, the length direction being perpendicular to a direction of gas flow.

2. The static mixer according to claim 1, wherein the gas accommodation part comprises:
    a first gas accommodation part having the first inlet formed on the top thereof and configured to introduce gases into the static mixer; and
    a second gas accommodation part having the plurality of second inlets separated from the first inlet to form separate flow paths for gases being introduced into the static mixer.

3. The static mixer according to claim 2, wherein the second gas accommodation part is closer to the discharge part than the first gas accommodation part with respect to the flows of the exhaust gases.

4. The static mixer according to claim 3, wherein the plurality of second inlets are formed independently of each other, so that the gases having different temperatures introduced from the first inlet and the plurality of second inlets are alternately discharged through the discharge part.

5. A static mixer for mixing exhaust gases to be supplied to a selective catalytic reduction device located at the back of a boiler, the static mixer comprising:
    a gas accommodation part having a first inlet and a plurality of second inlets partitioned from each other to introduce gases having different temperatures thereinto so that the gases introduced through the first inlet and the plurality of second inlets flow to a plurality of divided sections;
    a discharge part communicating with the gas accommodation part to collect and discharge the gases, the discharge part including a hollow portion; and
    a mixing plate part having a plurality of unit plates disposed on the upper and lower portions of the hollow portion of the discharge part in such a manner as to have a predetermined angle with respect to flow directions of the exhaust gases discharged,
    wherein the discharge part comprises a plurality of branched ducts extending from the hollow portion coupled to the mixing plate part in such a manner as to be arranged in the directions of the exhaust gases discharged.

6. The static mixer according to claim 5, wherein each of the branched ducts of the discharge part comprises:
    three upper unit plates;
    three lower unit plates pairing with the three upper unit plates in such a manner as to cross the three upper unit plates; and
    one lower unit plate spaced apart from the upper unit plate on an outer corner thereof.

7. A static mixer for mixing exhaust gases to be supplied to a selective catalytic reduction device located at the back of a boiler, the static mixer comprising:
    a gas accommodation part having a first inlet and a plurality of second inlets partioned from each other to introduce gases having different temperatures thereinto so that the gases introduced through the first inlet and the plurality of second inlets flow to a plurality of divided sections;
    a discharge part communicating with the gas accommodation part to collect and discharge the gases, the discharge part including a hollow portion; and
    a mixing plate part having a plurality of unit plates disposed on the upper and lower portions of the hollow portion of the discharge part in such a manner as to have a predetermined angle with respect to flow directions of the exhaust gases discharged,
    wherein the mixing plate part comprises:

a plurality of pairs of support pipes having one end coupled to an inner bottom surface of the hollow portion of the discharge part and the other end coupled to an inner top surface of the hollow portion of the discharge part; and the plurality of unit plates having opposing ends coupled to the plurality of pairs of support pipes.

8. The static mixer according to claim 7, wherein the plurality of unit plates comprises:

lower unit plates for blocking a portion of a lower flow path formed by the hollow portion of the discharge part; and upper unit plates for blocking a portion of an upper flow path formed by the hollow portion of the discharge part.

9. The static mixer according to claim 8, wherein the lower unit plates are disposed traversely with a predetermined angle with respect to the directions of the flows of exhaust gases discharged through the discharge part.

10. The static mixer according to claim 9, wherein the upper unit plates are disposed crossedly with a predetermined angle with respect to the lower unit plates.

11. The static mixer according to claim 7, wherein each support pipe of the plurality of support pipes comprises:

a connection pipe connected thereto to supply exhaust gas to an interior of the support pipe; and at least one or more nozzles disposed on an outer peripheral surface of the support pipe to discharge the exhaust gas supplied to the interior thereof.

12. The static mixer according to claim 11, wherein the at least one or more nozzles are disposed in a longitudinal direction of the support pipe.

13. The static mixer according to claim 12, wherein the at least one or more nozzles are disposed with predetermined angles in up and down or left and right directions with respect to the advancing directions of the exhaust gases.

14. A static mixer for mixing exhaust gases having different temperatures, comprising:

a first gas accommodation part having a first inlet for receiving a first exhaust gas;

a second gas accommodation part having a plurality of second inlets partitioned from each other for receiving a second exhaust gas having a temperature different from a temperature of the first exhaust gas;

a discharge part communicating with the first and second gas accommodation parts to receive the first and second exhaust gases having different temperatures and to discharge the first and second gases after mixing, the discharge part including a hollow portion;

a mixing plate part having lower unit plates disposed on lower portions of the hollow portion of the discharge part, the lower unit plates being traversedly angled with respect to flow directions of the exhaust gases, the lower unit plates configured to block a portion of a lower flow path formed by the hollow portion of the discharge part; and the mixing plate part having upper unit plates disposed on upper portions of the hollow portion of the discharge part, the upper unit plates being crossedly angled so as to cross the flow directions of the exhaust gases, the upper unit plates configured to block a portion of an upper flow path formed by the hollow portion of the discharge part; and an open region is formed between the upper and lower unit plates so as to provide an unblocked center flow path between the upper and lower flow paths in the hollow portion.

\* \* \* \* \*